United States Patent Office 2,751,288
Patented June 19, 1956

---

2,751,288

METHOD OF PRODUCING FINELY DIVIDED METALLIC SODIUM

Ernest R. Corneil, Thorold, Ontario, Canada, assignor to E. I. du Pont de Nemours and Company, Wilmington, Del., a corporation of Delaware No Drawing. Application November 30, 1955, Serial No. 550,203

2 Claims. (Cl. 75—.5)

This invention relates to the production of finely-divided metallic sodium.

The reactivity of sodium increases markedly with subdivision of the material. For this reason the metal is frequently utilized as small, relatively uniform spherules, particularly in organic reactions. These spherules have been prepared heretofore by melting bulk sodium and dispersing it with agitation under the surface of a dry hydrocarbon oil, toluene, xylene or other high-boiling liquid inert to sodium. When the sodium has been required free from the dispersing liquid, it has been the practice to filter out the spherules, wash them with a relatively low-boiling liquid and remove this second liquid by evaporation in a nitrogen atmosphere.

While the process described is quite satisfactory for small-scale production, particularly in the laboratory, it is too expensive for employment on a large scale. The expense is largely caused by the use of two solvents and the double-handling necessitated thereby. In addition, it is difficult to prepare uniform material by the prior art process. This lack of uniformity in particle size may be due, at least partly, to difficulties in obtaining uniform agitation during the cooling period by conventional methods.

An object of the present invention is, consequently, provision of a new and improved process for reducing metallic sodium to the finely-divided state.

Another object is provision of a method for producing finely-divided, metallic sodium that is simpler and cheaper than methods heretofore used.

A further object is provision of a method for the large-scale production of finely-divided sodium of relatively uniform particle size.

The above-mentioned and yet further objects are achieved in accordance with this invention by a process in which metallic sodium is first melted and dispersed at a preselected initial pressure in an inert liquid having a boiling point above the melting point of the sodium, 97.5° C. at 760 mm. of mercury pressure. The pressure on the liquid is then lowered and the liquid allowed to evaporate, cooling and solidifying the sodium. Bubbles of the escaping gas provide agitation to prevent coalescence of the sodium droplets during the cooling period.

The initial pressure used in the process may be any pressure at which the solvent employed remains liquid above the melting point of sodium. Ordinarily ambient pressure is preferred. Superatmospheric or even subatmospheric pressure may, however, be used if desired. The second or reduced pressure may be any pressure at which the solvent vaporizes at the temperature utilized.

Petroleum ether, cyclohexane and heptane represent inert solvents which remain liquid at about 98° C. only under superatmospheric pressure, i. e. about 15 lb./in.$^2$ gauge. Release of this pressure will permit vaporization of the solvent, which is recovered, and obtainment of the sodium spherules. Toluene, ethylbenzene and xylene, on the other hand, remain liquid at atmospheric pressure and about 98° C. and hence must be removed under a vacuum.

In one run, which may be considered as an example illustrating the process of the invention, 250 g. of sodium was melted under an inert atmosphere and dispersed with stirring in 250 cc. of xylene at ambient pressure and a temperature of 112° C. Stirring was continued for 30 minutes at about 112° C. and was then stopped. The pressure on the xylene was reduced to 30 mm. of mercury and the temperature allowed to fall freely below the melting point of the sodium. Agitation was provided during the evaporation of the solvent by escaping bubbles of vapor. The xylene was completely removed by evaporation and the sodium was recovered in the form of free-flowing spherules with a uniform diameter of about 2 to 50 microns. 90% of the particles were less than 5 microns in diameter.

Having described my invention, I claim:

1. The method of preparing sodium spherules of substantially uniform particle size which comprises sequentially (1) dispersing liquid sodium in an inert liquid held at a temperature above the melting point of sodium, (2) reducing the pressure on the liquid and completely evaporating the same from the sodium while simultaneously cooling the sodium to a temperature below the melting point thereof and (3) finally recovering the sodium in particulate form.

2. The method of claim 1 in which the inert liquid is a member of the group consisting of petroleum ether, cyclohexane, heptane, toluene, ethylbenzene and xylene.

No references cited.